United States Patent [19]
Brandt

[11] Patent Number: 5,851,591
[45] Date of Patent: Dec. 22, 1998

[54] CONDUCTIVE-RESISTIVE SURFACE COATING COMPOSITIONS AND METHODS

[75] Inventor: Fred D. Brandt, Brinnon, Wash.

[73] Assignee: Electro Forming Systems Co., Inc., Silverdale, Wash.

[21] Appl. No.: 811,849

[22] Filed: Mar. 5, 1997

[51] Int. Cl.$^6$ .................................................. B05D 3/10
[52] U.S. Cl. ........................................ 427/333; 427/341
[58] Field of Search ........................... 252/512; 427/333, 427/337, 340, 341

[56] References Cited

U.S. PATENT DOCUMENTS

| | | | |
|---|---|---|---|
| 3,674,670 | 7/1972 | Erikson et al. | 204/181 |
| 4,595,605 | 6/1986 | Martin et al. | 427/96 |
| 4,929,390 | 5/1990 | Sayles, Sr. | 252/510 |
| 4,971,727 | 11/1990 | Takahashi et al. | 252/511 |

OTHER PUBLICATIONS

Material Safety Data Sheet, OMI International Corp, Warren, MI (May 27, 1986).

*Primary Examiner*—Erma Cameron
*Attorney, Agent, or Firm*—Townsend and Townsend and Crew

[57] ABSTRACT

The invention provides compositions and methods for forming conductive-resistive coatings on non-conductive surfaces. A pre-conductive coating composition contains a lacquer base, including nitrocellulose as a base solid and butyl acetate as a solvent, and a conductive agent. The pre-conductive coating composition is applied to a surface to be coated and allowed to dry. After drying, the pre-conductive coating is exposed to a developer capable of developing the pre-conductive coating to yield a selected conductive-resistive capacity to a final, conductive-resistive coating. The resistance of this final coating can be finely selected for different applications, including a variety of application which employ the conductive-resistive coating as a self-heating surface coating.

28 Claims, 4 Drawing Sheets

CONDUCTIVE-RESISTIVE SURFACE COATING COMPOSITIONS AND METHODS

TECHNICAL FIELD

The present invention relates to methods and compositions for coating surfaces. More specifically, the invention relates to methods and compositions for coating nonconductive surfaces to form a conductive surface coating thereon.

BACKGROUND OF THE INVENTION

Various methods and compositions have been developed for applying conductive finishes or surface coatings to articles to obtain a conductive surface on the article. The majority of these methods and compositions have found application in the field of electroplating. In this process, parts to be coated with metal are first sprayed or dipped in a conductive paint or primer, generally a lacquer or varnish which contains a suspension of conductive particles, such as graphite, copper or silver. Such paints variously employ methacrylate type resins, cellulose esters, nitrocellulose or an epoxy base as binders, and result in a highly conductive surface coat to serve as a base for metal plating. These types of paints are also the forerunners of conductive plastics used in RF shielding, the latter of which typically contain silicone resins having a high content of silver flake to provide conductivity and used in sheet or molded form.

Various other conductive paints use gold as the conductor and epoxy resin as the binder. These are largely directed for use on non conductive materials in the electronics industry. In addition, copper based paints have been developed for application as a conductive coating, an example of which employs a nitrocellulose lacquer, lacquer thinner and copper lining powder. Other conductive paints or primers utilize a polyurethane base. For example, U.S. Pat. No. 4,971,727 issued to Takahashi et al. on Nov. 20, 1990 discloses a polyurethane based conductive primer for coating plastics.

Although most of the above mentioned paints and coatings can be useful to provide a conductive surface coating, they all suffer important drawbacks. Most particularly, the mixing, storage and/or application of these compositions has proven difficult, or hard to control. This is attributable in part to gelling that occurs following mixing of the conductive metals with other ingredients and solvents, which results in oxidation of the metal and gelling or congealing of the conductive paint. This in turn results in clogging of spray nozzles, and can compromise the texture and evenness of coating if the paint is not used very quickly. Also, many of the aforementioned conductive paints have undesirable surfacing properties, such as pitting, as well as very long drying times. They also often contain expensive metals (e.g., silver and gold) and other ingredients, and may be highly toxic and/or carcinogenic.

In addition to these drawbacks, the aforementioned conductive paints and related compositions are incapable of providing a suitable conductive-resistive coating functional to provide a self-heating capacity to surfaces of coated articles. In this context, the aforementioned paints and related compositions are generally heat labile, and therefore cannot withstand sufficient temperatures desired for a self heating coating. More importantly, the aforementioned conductive paints and related compositions have inadequate resistance properties to serve as a self-heating surface coating.

In view of the above, there is a need in the art for a conductive coating composition that is inexpensive to make and use and has good stability to allow easy mixing, storage and application, including efficient spray application.

A further need exists in the art for a conductive coating composition that has a quick drying time, low toxicity and which is not carcinogenic.

Yet another need exists in the art for a conductive coating composition that is highly heat stable and has sufficient resistance when applied to function as a self-heating surface layer.

SUMMARY OF THE INVENTION

It is therefore an object of the invention to provide compositions and methods for producing a conductive-resistive coating on non-conductive surfaces, which compositions and methods rely on inexpensive materials and processes to make and use, and which compositions have improved stability and shelf life to enable easy mixing, storage and application, particularly spray application.

It is a further object of the invention to achieve the above objects in compositions and methods which provide superior surfacing properties, fast to moderate drying times, low toxicity and are not carcinogenic.

It is yet another object of the invention to achieve the above objects in compositions that are highly heat stable and have adequate resistance properties when applied to a surface to function as a self-heating surface coating.

The invention achieves these objects and other objects and advantages by providing novel compositions and methods for forming conductive-resistive coatings on non-conductive surfaces. More specifically, a pre-conductive coating composition is provided which contains a lacquer base, preferably a nitrocellulose/butyl acetate lacquer base, and a conductive agent. The pre-conductive coating composition is applied to a surface to be coated and allowed to dry. After a suitable drying period, the pre-conductive coating is exposed to a developer composition capable of developing the pre-conductive coating to have a selected conductive-resistive capacity.

DESCRIPTION OF THE SPECIFIC EMBODIMENTS

As noted above, the invention provides novel compositions and methods for producing a conductive-resistive surface coating on a non-conductive base surface, for example a surface of plastic, glass, organic material and the like. Within the compositions provided by the invention, a preferred pre-conductive coating composition includes a lacquer base, more preferably a nitrocellulose/butyl acetate lacquer base, mixed with a conductive agent.

A lacquer base using a butyl acetate solvent and nitrocellulose as a base solid represents a preferred component of the conductive-resistive coating compositions of the invention. One commercially available lacquer base, marketed as "Sher-wood" gloss T75 C 42 (made by the Sherwood Williams Paint Company, Cleveland, Ohio) has proven particularly useful within the invention, primarily because it lacks amyl acetate which is the typical solvent for lacquer paints, and instead uses butyl acetate. A similar lacquer base formula useful within the invention is available from the Rudd Paint Company (Seattle, Wash.), which also features a suitable admixture of solids and solvents for formulating pre-conductive compositions within the invention. Specifically, this lacquer base contains about 24% solids as a percentage of total volume, of which solids about 30–45% is nitrocellulose, 10–20% is a plasticizer (diethylexalatetarphthalate) and 40–50% is a short oil alkyd (drying agent). The evaporative portion of this lacquer base is about 60–85%, preferably about 75%, butyl acetate (or isobutol acetate), 5–15% toluene and 0–10% isopropyl alcohol by volume. This lacquer base as a whole requires only moderate safety handling, and is not carcinogenic.

The relative proportions of ingredients of the pre-conductive coating composition may be adjusted in a variety of ways for a variety of purposes. A preferred formula for the pre-conductive coating composition includes approximately 195 ml of the lacquer base mixed with approximately 0.45 kg of a metallic powder and further thinned by addition of about 565 ml of butyl acetate in addition to the solvent already present in the lacquer base. The lacquer base should preferably have about 25% solids by volume, with about 60–85% of the volatile content by volume being butyl acetate. Thus, a preferred lacquer base in this regard is the "Sher-wood" gloss T75 C 42 lacquer paint identified above. Approximately 195 ml of this lacquer base is suitably combined with approximately 0.45 kg metallic powder and 565 ml of butyl acetate in a container and mixed thoroughly.

Adjustments in the relative amounts of lacquer base, solvent and conductive agent can be made for various reasons, which adjustments will be readily apparent and routinely practiced by the ordinarily skilled artisan. It is important to note in this regard that too much solvent in the pre-conductive coating composition undesirably breaks down the binding function of the lacquer, so that it fails to hold the metal or other conductive agent to the surface to be coated. As a result, the coating does not stick well or uniformly, and/or is easily rubbed off by abrasion. Addition of solids to the general formula set forth above may desirably or undesirably result in a diminution of conductivity of the final conductive-resistive coating and a corresponding increase in the resistance of the coating. Converse changes may be achieved by adjusting the amount or conductivity of the conductive agent.

Figure 1:
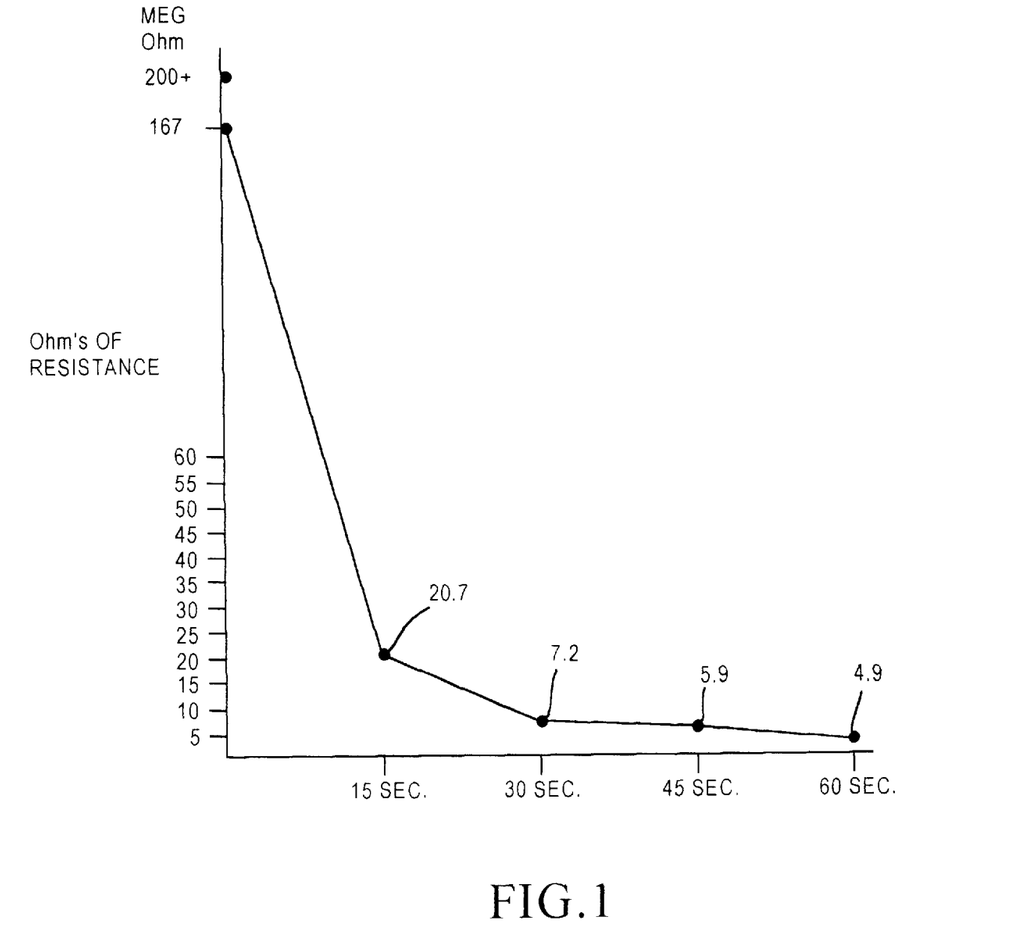
FIG. 1 depicts developing results (expressed as ohms of resistance on the Y-axis as a function of seconds of immersion time in developer prior to rinsing) for a pre-conductive coating composition having 120 ml of lacquer mixed with 0.45 kg of metallic powder and further thinned by addition of approximately 640 ml of butyl acetate. The pre-conductive coating was developed at 68° F. in a solution of 1.6 ounces of UDYPREP®350 in one quart distilled water, adjusted to pH 2.3, followed by a rinse at 68° F. for 30 seconds in distilled water adjusted to pH 5.7.
Figure 2:
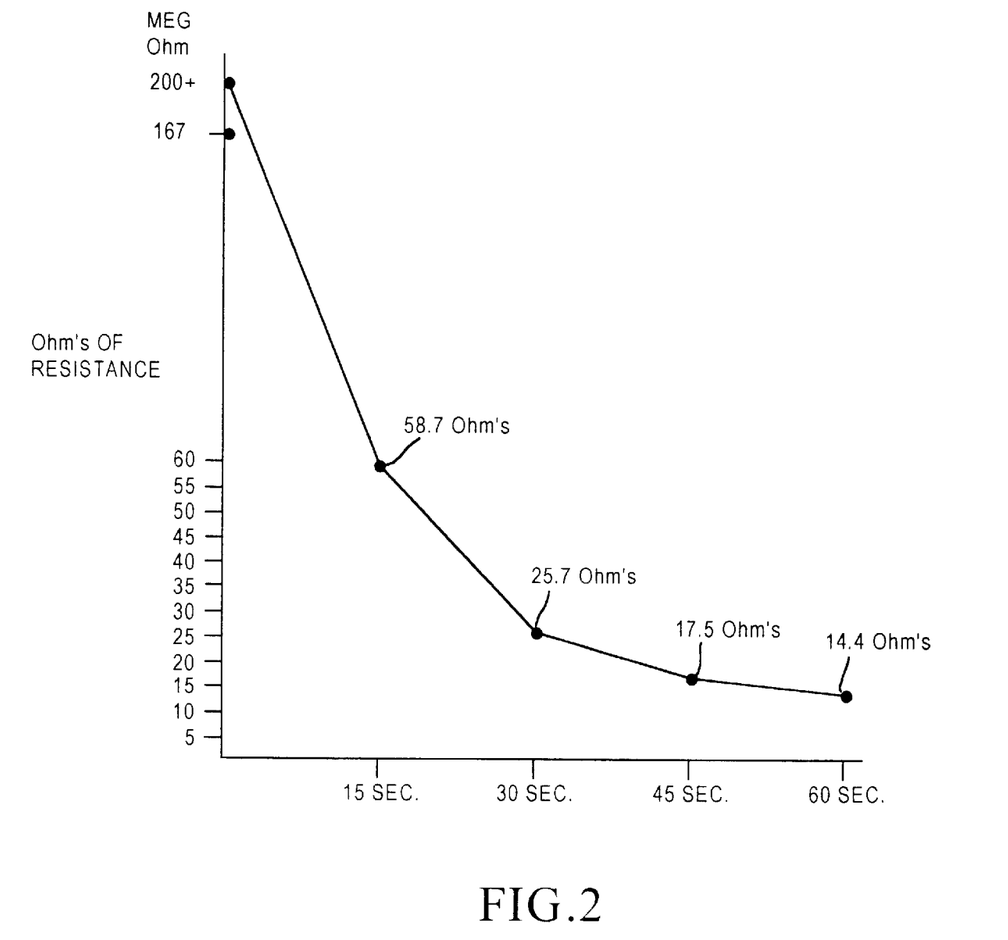
FIG. 2 depicts developing results for a pre-conductive coating composition of the invention having a preferred lacquer content of about 195 ml of lacquer base mixed with 0.45 kg of metallic powder and further thinned by addition of approximately 565 ml of butyl acetate, developed and rinsed according to the conditions outlined above for FIG. 1.

The amount of lacquer base included in the pre-conductive coating composition is an important factor in determining the ability to develop the pre-conductive coating to achieve a desired, "selectable" conductive-resistive capacity to the final conductive-resistive coating. As is a described in further detail below, a minimum amount of lacquer is necessary to provide a suitable level of control over the developing process to allow selection of a desired conductivity or resistance value or range of values in the final coating. If the relative amount of lacquer is too low, developing proceeds too rapidly and the pre-conductive coating develops conductivity too fast. Consequently, the resistance drops precipitously during development to a level that is too low for most desired applications, for example to form a self-heating coating (see below). Under such circumstances, the conductive-resistive capacity of the final conductive-resistive coating composition is not selectable using reasonably controlled and repeatable methods. Selectability of resistance can be further understood in terms of the examples and figures presented below. Referring, for example, to FIGS. 1 and 2, FIG. 1 depicts developing results for a pre-conductive coating composition having only 120 ml of lacquer mixed with 0.45 kg of metallic powder and further thinned by addition of approximately 640 ml of butyl acetate. In contrast, FIG. 2 depicts developing results for a pre-conductive coating composition of the invention having about 195 ml of lacquer base mixed with 0.45 kg of metallic powder and further thinned by addition of approximately 565 ml of butyl acetate. As depicted in FIG. 1, the composition having a lower lacquer base to butyl acetate ratio yields a precipitous increase in conductivity of the resultant coating, lowering the resistance to approximately 20.7 ohms measured across a 4 inch by 6 inch coated panel under the conditions specified after just 15 seconds, and to approximately 7.2 ohms across the same surface area after only 30 seconds. In contrast, FIG. 2 shows that a conductive-resistive coating of the invention, having a preferred minimum amount of lacquer base (e.g., approximately 195 ml lacquer base, approximately 0.45 kg metal powder and about 565 ml butyl acetate in addition to a pre-mixed amount of butyl acetate (approximately 60–85% and preferably about 75% of the evaporative portion of the lacquer base) already formulated in the lacquer base), yields a much more controlled development process, producing a resistance of the final conductive-resistive coating of about 58.7 ohms across a 4×6 inch plate after 15 seconds of developing time, and 25.7 ohms after 30 seconds of developing time. (As expressed herein, resistance is determined by, e.g., measurement of resistance across a defined distance or surface area of the coating. Unless expressed otherwise, conductivity and resistivity values are given based on measurements of resistance diagonally across a flat, 4×6 inch panel coated with approximately ¼ to ½ ounce of the pre-conductive coating composition; whereas it will be understood that these values will be predictably different for smaller or larger surface areas, different thicknesses of coatings, or due to other routinely adjustable variables discussed herein).

The foregoing example demonstrates selectability of resistance values for the conductive-resistive coating, whereby one or more of the pre-conductive coating and developer compositions, and/or other process variables (see below) can be controllably adjusted to yield a selected resistance value within a wide range of desired resistance values to render the conductive-resistive coating self heating with a correspondingly selectable thermal increase capacity (wherein a higher selected resistance value generally correlates with a commensurately increased thermal increase capacity) useful for a broad range of applications.

By adjusting one or more of the ingredients, steps and variables within the compositions and processes of the invention, for example by adjusting the composition of the pre-conductive coating, the composition and/or pH of the developer (see below), the duration of development and/or the pH of the rinse (see below), a final resistance of the conductive-resistive coating can be selected within a preferred range of desired values, e.g., within a preferred range of approximately 5–1,000 ohms, preferably between about 10–300 ohms, more preferably between about 15–60 ohms, or between about 20–35 ohms (all values being measured across a flat, 4×6 coated panel), depending on the intended application of the coating.

Preferably, the choice of compositions for the pre-conductive coating and developer, and the choice of other adjustable variables of the coating compositions and processes of the invention, yield fine selectability of resistance for the final conductive-resistive coating. As used herein, fine selectability means that the conductivity of the conductive-resistive coating can be selectively increased during the developing process at a gradual, finely controllable rate of between about 50–300 ohms of increased conductivity per 15 seconds of developing time, preferably between about 20–30 ohms of increased conductivity per 15 seconds of development time, more preferably between about 1–20 ohms of increased conductivity per 15 seconds of development time, down to as gradual as between about 0.5–2 ohms per 15 seconds of development time, or slower (all of which conductivity values being measured across a 4×6 inch coated panel).

Selectability of final resistance properties of a conductive-resistive coating is not provided by conductive paint coatings known in the art. This is due in part to the undesirably low lacquer content of these coatings, which generally is associated with very high and poorly controllable conductivity (correlated with low to negligible resistance) of a final coating from these compositions when they are developed according to the compositions and methods of the present invention. By comparison, the finely selectable conductivity/resistivity properties of the conductive-resistive coatings of the invention are achieved in part by using a preferred ratio of lacquer base to butyl acetate of at least about 1:5, preferably about 1:4 and more preferably about 1:3 by volume (wherein the butyl acetate value of this ratio does not include butyl acetate already within the lacquer base, as specified above, but refers to additional butyl acetate used to thin the lacquer base; although thinning is unnecessary in that the pre-conductive coating composition can be formulated in a single operation by combining lacquer base materials, other than butyl acetate, with a total desired amount of butyl acetate).

The use of butyl acetate or, alternatively, isobutol acetate, as a solvent provides critical advantages over conventional solvent systems used in standard conductive paint compositions. Specifically, butyl acetate has been found to significantly reduce the level of oxidation of the conductive agent used in the compositions, as well as to prevent the compositions from drying too quickly. Other commonly used solvents, including amyl acetate, lacquer thinner, methyl ethyl ketone and acetone all produce undesirable results, most important of which is a substantial gelling effect and poor sprayability and shelf life attributable to oxidation involving the conductive agent.

The use of nitrocellulose as a base solid also provides important advantages to the conductive-resistive coating, because this ingredient facilitates hardening of the pre-conductive coating composition and confers outstanding durability and heat stability to the final, conductive-resistive coating. Other, less preferred base materials which may be used in place of nitrocellulose include acrylics, vinyls, acetate butyrate and proponate.

A variety of conductive agents are useful within the compositions and methods of the invention. However a powdered or flaked, bronze preparation preferred, most preferably a printer's ink grade, fine powder capable of forming a true colloidal mixture within the compositions set forth herein. A variety of suitable bronze preparations are readily available from a number of domestic and foreign commercial sources, for example U.S. Bronze Powders Inc. of Flemington, N.J. Alternative conductive agents include conductive preparations of copper, silver, gold, titanium, zinc, antimony trichloride, graphite, fibrous or balloon shape or similar shape metal coating fillers, fibrous or the like shaped metal powders and conductive adjusters. The desirability of these alternative conductive agents is generally limited compared to that of the aforementioned bronze agents. Comparing bronze to the other metals mentioned, bronze is generally less reactive with solvents (for example compared to copper or silver) and is therefore less likely to gel in non-preferred base mixtures. Further, bronze is less reactive than other metals in the acid environment of the developer, facilitating regulation of the development process. To illustrate this latter point, it has been observed that a pre-conductive coating composition containing copper as the conductive agent reacts rapidly in the developer solution to yield a highly conductive, but poorly resistive surface coating.

The pre-conductive coating compositions of the invention optionally include a selected plasticizing additive, preferably a resin, and most preferably di-ethyl terpthalate, which provides desired flexibility to the resultant conductive-resistive surface coating and assists in keeping the base solids in suspension prior to drying.

The use of alternative base materials for mixing the pre-conductive coating composition, including vinyl and polymer paints incorporating alcohol/water solvent systems, has been found to be a satisfactory alternative in certain aspects of the invention. However, these base materials are not preferred in most aspects of the invention, for a number of reasons. Primarily, these types of base compositions are generally heat labile, beginning to flow at about 140° F., and to decompose at only slightly higher temperatures of around 145° F. In contrast, the preferred pre-conductive coating compositions of the invention, incorporating a lacquer base in combination with other ingredients, are heat stable to approximately 275° F. Likewise, vinyl and polymer based compositions require substantially greater drying times (one hour or more at room temperature, versus approximately 30 minutes for preferred compositions), and have very short shelf lives (approximately one day, with spray application required at the point of mixing to achieve satisfactory results). In addition, the increased flexibility, or flow, of vinyl or polymer based compositions over lacquer based compositions may disrupt the continuity of the conductive-resistive surface, which has been noted to result in spot burning of conductive-resistive surface coatings when power is applied to generate heat.

Shelf lives of preferred pre-conductive coating compositions within the invention are indefinite. Unlike previously known paints and coatings that may provide a conductive surface coating, the mixing, storage and/or application of the pre-conductive coatings of the invention are simple, and easy to control. Gelling that occurs following mixing of conventional conductive paints does not occur or occurs at a much slower rate with the pre-conductive coating compositions of the invention, and the concomitant clogging of spray nozzles or compromising of the texture and evenness of coating if the composition is negligible even if the compositions are not used quickly. A shelf life of ten days represents a suitable shelf life for the pre-conductive coating compositions of the invention, with a shelf life of between one month to six months being more preferred. Most preferably, a shelf life of one year or more is achieved according to the compositions and methods described herein, wherein continued shelf life is marked by an ability to use the pre-conductive coating composition in a standard air-brush spray apparatus without substantial or prohibitive gelling and clogging of the spray nozzle.

The pre-conductive coating compositions of the invention have excellent surfacing properties, short drying times, and do not contain expensive or highly toxic materials. To apply the pre-conductive coating composition to a selected surface, the surface may be dipped in the pre-conductive coating composition, or alternatively brushed or sprayed with the composition to form a pre-conductive coating on the surface. Spraying is preferable to achieve a desired surface coating which is not too thick to require excessive drying or compromise performance characteristics, and which is not streaked, pooled or pitted. To apply by spraying, a high quality air brush is preferred, and should be equipped with an oil and moisture filter. The air pressure is preferably set at about 20 p.s.i., and the brush is preferably held at a spray distance of approximately 6–9 inches from the surface to be coated. Coating should be even, and excess coating composition should be wiped of with a very soft cloth (e.g. a cotton cloth) or brush. To achieve a preferred thickness of the pre-conductive coating, approximately ¼ to ½ ounce, and preferably about ⅓ ounce, of the pre-conductive coating composition should be sprayed per square foot of surface to be coated.

After the surface has been sprayed in the manner described above, the pre-conductive coating should be allowed to dry for approximately 10–30 minutes. Drying time will depend on the temperature, and can be shortened by raising the temperature up to about 250° F. For example, drying time of preferred compositions in an oven at 100° F. is about 5 minutes or less. However, room temperature drying, which requires up to approximately 30 minutes to complete for preferred thickness coatings, is generally preferred for cost and other reasons. As will be appreciated by persons of ordinary skilled in the art, requisite drying times will vary depending on the thickness of an applied coating. Thicker coatings of course require more time, and attention should be paid in applying thicker coatings to preventing surface flotation of the binder that may compromise adherence of the coating, among other effects.

After a suitable drying period, the pre-conductive coating is exposed to a developer solution capable of developing the pre-conductive coating to yield a selectable conductive-resistive capacity of the developed, conductive-resistive coating. The developer acts to increase the conductivity of the pre-conductive coating from an essentially non-conductive level (i.e. in the range of meg ohms to hundreds of meg ohms) to a desired conductive-resistive level, in a gradual and therefore selectable manner. To achieve a desired conductive-resistive level, the composition of the pre-conductive coating and developer (see below) can be adjusted along with other variables, independently or coordinately, to yield a final conductive-resistive coating that is conductive, but not so highly conductive that the coating lacks sufficient resistance to become self-heating when power is applied to the coating and current is generated through the conductive-resistive surface coating. Accordingly, the conductive-resistive coating must have at least a thermally generative resistance value, which is defined as a minimal resistance value to provide a significant self-heating capacity. Significant self-heating capacity means that a surface temperature of the conductive-resistive coating can be raised at least 3°–5° F. above ambient temperature when a selected power source (e.g. a 6 volt, 9 volt, 20 volt, 40 volt, 60 volt or 120 volt power source) is electrically connected to pass current through the coating. This self-heating capacity will of course depend upon the thermal properties of the coated article and on other heating or cooling influences on the conductive-resistive coating, as well as upon the surface area of the coating and the nature and extent of power supplied to the conductive-resistive coating to generate the heat. However, at room temperature and under normal conditions of conductive, convective and radiative heat loss (e.g., where a flat coated plate is tested at room temperature without being exposed to forced air circulation), a conductive-resistive coating applied to a ⅛ inch lexan panel spray coated in the manner described herein, will be capable of self-heating to achieve a surface temperature increase of at least 3°–5° F., and preferably between about 5° F. and 25° F. More preferably, the self-heating capacity will equate with a capacity to increase the surface temperature between about 25° F. and 50° F., even more preferably between about 50° F. and 100° F., and most preferably between about 100° F. up to a maximum surface temperature of about 275° F. At temperatures substantially higher than 275° F., the conductive-resistive coating will start to decompose and will require re-coating or spot re-coating.

By selecting different compositions for the pre-conductive coating and developer, and/or by choosing other adjustable variables of the coating compositions and processes of the invention, the thermal increase capacity of the final conductive-resistive coating can be selected incrementally, e.g. at increments of 50° F., 25° F., 10° F., 5° F. and as fine as 1°–5° F. based on corresponding, incremental adjustments of conditions, e.g., adjustments of the lacquer content of the pre-conductive coating composition, of development period, of the strength of the developer solution, etc. For example, by decreasing the strength of developer, the developing process is slowed so that finer increments of thermal increase capacity of the final coating can be obtained at fixed increments of developing time (i.e., the incremental change in thermal increase capacity that occurs, for example, between 10 seconds and 30 seconds of developing time will be of a lesser magnitude than when a stronger developer solution is used). Similarly, finer increments of thermal increase capacity can be selected merely by selecting shorter increments of developing time (i.e., the incremental change in thermal increase capacity that occurs, for example, between 10 seconds and 30 seconds of developing time will be of a greater magnitude than when a narrower increment of developing time, e.g. 10–15 seconds, is selected, because each increased increment of development time yields a pre-determined, incremental increase in conductivity and corresponding a decrease in resistivity and thermal increase capacity).

In certain embodiments of the invention, the conductive-resistive capacity and resultant self-heating capacity of the conductive-resistive coating will be desirably selected within a higher or lower, or broader or narrower, range than reflected by the aforementioned thermal increase capacity values. This broad selectability of self-heating capacity correlates with the range of selectability of resistance values and can be routinely achieved according to the compositions and methods provided herein. For coating medical instruments, for example, the thermal increase capacity of the conductive-resistive coating may be desirably limited to a narrow range of about 25° F. to 30° F., to safely heat a coated surface, e.g., of a stethoscope or X-ray table, from room temperature to approximately body temperature when a selected power source is electrically connected to the coating. Alternatively, applications such as heating of interior or exterior control panels, surfaces of satellites exposed to the cooling influences of space, survival blankets and other applications, will have their own preferred ranges and values of conductive-resistive capacity for the coating. In this regard, it is a matter of routine analysis and design to conduct heat loss studies and determine desired resistance values for the coating that correlate with a desired power supply and heating capacity of the coating. For example, it is contemplated that a low voltage power supply will be desired for a survival blanket (e.g., a thin-film blanket coated with the conductive-resistive coating of the invention or invested with a web of threadlike material coated with the conductive-resistive coating), whereby a selected resistive capacity of the blanket can be routinely determined based on the properties (e.g., voltage and amperage) of the power source and other routinely selected design parameters.

As noted above, the conductivity and resistance, and therefore the thermal increase capacity, of the conductive-resistive coating can be pre-determined and repeatably achieved by a worker within a broad or very fine desired range, e.g., to yield a fine-selected conductivity and resistance of a final conductive-resistive coating within a narrow range of conductive-resistive values. To provide for selectability of resistance values for the final conductive-resistive coating, the developer preferably comprises an acidic solution, having a preferred pH of pH 3.0 or less, more preferably about pH 1.8 to 2.5, and most preferably about pH 2.3, and a low-corrosivity, so as to drive the developing reaction without yielding excessively corrosive attack on components of the coating composition. Preferred developers to yield these desired results, and which have been found suitable to confer a selectable resistive capacity to the developed, conductive-resistive coating, include an aqueous sodium fluoride/hydrogen sulfate solution, as well as other solutions of like corrosivity and physicochemical characteristics. On such preferred preparation comprises salts of sodium fluoride/hydrogen sulfate, preferably about 85–95% by weight sodium hydrogen sulfate and 2.5–5% fluorides as F. In contrast, sulfuric acid solutions and other strong acids are generally too corrosive and result in unpredictable, and non-selectable development results. Other useful developers may be selected from a variety of commercially available "activators," well known in the electroplating industry and used to remove corrosion and render surfaces highly conductive for electroplating. One such activator that exhibits preferred activity within the invention is a commercial activator widely used in the metal plating industry and known as UDYPREP®350, made by OMI International of Warren, Mich. Mixture of this formulation with distilled water results in a suitable acid solution for the developer having low corrosivity and providing a controllable solution for developing the conductive-resistive coating. It should be noted that this and other useful activator preparations may be somewhat hazardous to work with, and due care should be taken, including a thorough review of the Material Data Safety Sheet (MSDS) available from the manufacturer and the U.S. OSHA agency. In the case of UDYPREP and a number of other developer agents suitable for use within the invention, thermal decomposition of the preparation may yield toxic oxides of sulfur, and fluorine poisoning may also be a risk. A water flush facility should be provided in the work area to remove any of the developer material from the skin or eyes, and caution should be taken to avoid spills. However, such commercial activators are significantly more difficult to control than other developer formulas tested for use within the invention.

A preferred developer formula may also be prepared by adding copper to a standard activator solution formulated in distilled water. In this context, a preferred developer formula contains about 4.0 to 4.5 pounds of commercial activator (e.g. UDYPREP®350) and about 0.5–1.0 ounces of copper in about 10 gallons of distilled water, mixed thoroughly till dissolved and adjusted to a pH between about 1.8 to 2.1.

Figure 3:
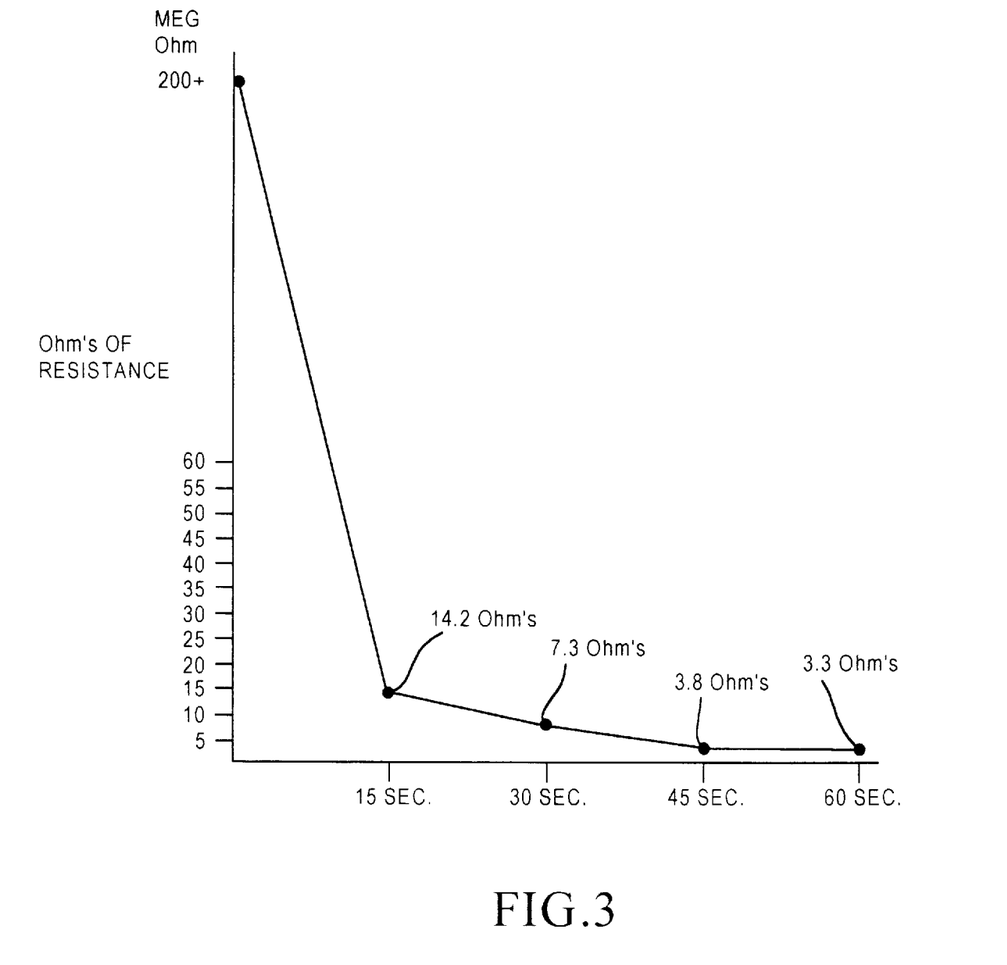
FIG. 3 depicts developing results for a pre-conductive coating composition of the invention having about 195 ml of lacquer base mixed with 0.45 kg of metallic powder and further thinned by addition of approximately 565 ml of butyl acetate, developed and rinsed according to the conditions outlined above for FIG. 1, except that the developer used was a solution of 4.0 ounces of UDYPREP®350 in one quart distilled water.

Selectability of resistance values for the conductive-resistive coatings of the invention based on developer composition and other variables of the developing process is illustrated by the examples and figures presented below. Referring, for example, to FIGS. 2 and 3, FIGS. 2 and 3 depict developing results (expressed as ohms of resistance on the Y-axis as a function of seconds of immersion time in developer prior to rinsing) for a pre-conductive coating composition of the invention having about 195 ml of lacquer base mixed with about 0.45 kg of metallic powder and further thinned by addition of approximately 565 ml of butyl acetate. Notably, the strength of the developer solution of FIG. 2 is selected by adding about 1.6 ounces of a commercial activator (UDYPREP®350) to one quart of distilled water, and the temperature of the developer is selected at about 68° F. At this strength and temperature, the developer yields a highly controllable reaction whereby the pre-conductive coating increases its conductivity and decreases its resistivity as a function of time in the developer at a rate that yields fine-selectability for obtaining pre-determined resistance values within a selected range of resistance values desired for the final conductive-resistive coating. For example, if a desired resistance of the coating is between about 25 and 60 ohms across a 4×6 inch coating, a selected time of developing may be chosen between about 15 and 30 seconds. Based on the gradual kinetics of development achieved (e.g., as a combined function of the lacquer content in the pre-conductive coating composition, the strength, pH and temperature of the developer, among other selectable variables specified herein) resistance values can be routinely selected within this range of 25–60 ohms by adjusting the developing time accordingly within the 15–30 second range at a selected developer concentration and temperature. Naturally, other resistance values can be selected by using greater or lesser developing times, developer strengths and pH values, developer temperatures, etc. For example, as shown in FIG. 2, a resistance between about 15 ohms and 25 ohms across a 4×6 inch panel can be selected by developing between about 30–60 seconds under the conditions specified.

In contrast, these selectable resistance values cannot be achieved at comparable development times and temperatures if the developer is adjusted in strength (e.g. by increasing the concentration of activator or other developing agent) to yield accelerated kinetics of development. As depicted, for example, in FIG. 3, increasing the developer strength from approximately 1.6 ounces to about 4 ounces of UDYPREP®350 per quart of distilled water accelerates the developing time at 68° F. so that a range of resistance between 25 ohms and 60 ohms becomes non-selectable. In this context, non-selectable means that the kinetics of the developing reaction are too fast to achieve a desired resistance value of the final conductive-resistive coating within a selected time period of development, for example within a narrow time window of between 15–30 seconds. Suitable development periods in this context range between a fraction of a second and up to ½ hour or more. Preferably however, desired resistance values are achieved by selecting development times between about 5 seconds and 10 minutes, more preferably between about 10 seconds and 3–5 minutes. Most preferably, development periods are selected incrementally, e.g. at increments of 10 seconds, 15 seconds, 30 seconds, 1 minute, 3 minutes, up to five minutes or more, to allow selection among an incremental range of resistance values for the final coating (i.e., where each increased increment of development time yields a pre-determined, incremental increase in conductivity and corresponding decrease in resistivity).

When developing is complete, the coating is rinsed in a pH adjusted distilled water bath to stop the developing process and remove the acid from the developer that would otherwise corrode the coating if left unfixed. The pH of the rinse bath is also important in regulating the conductive-resistive properties of the resultant coating, whereby fine selectability of the resistance and self-heating capacities of the final coating can be even more tightly controlled by selecting a preferred rinse pH value to adjust the timing and rate at which the developing process is stopped. Specifically, it has been determined that a rinse pH below about pH 5.0 often fails to stop developing quickly enough, so that development proceeds beyond a desired point and conductivity increases and resistance drops beyond desired levels. In contrast, a rinse pH of 6.8 may cause the developing process to stop too abruptly, also yielding undesirable results. In this regard, it is preferred that the pH of the rinse be selected to achieve attenuated stoppage of the developing process, i.e., whereby developing does not stop immediately but proceeds for a defined period and tapers off gradually at a selected rate as the developer is diluted and locally exhausted (i.e., reacted) at the surface of the coating. To achieve this goal, a pH range of the rinse between about 5.5 to 6.5 is preferred, with a pH of about 5.8 being preferred to yield further control of development and therefore finer selectability of resistivity and self-heating capacity of the resultant coating. In this context, the attenuated stoppage of developing upon exposure of the coating to the rinse bath provides for yet another step to exert refined control over the developing process and thereby further refine the selectability of resistivity and self-heating capacity of the resultant coating. This additional step involves re-exposing the coating to developer after rinsing and then re-exposing the coating to the rinse bath after the second exposure to developer, to provide a repeated cycle of developing and attenuated stoppage of development. This repeated cycle can itself be repeated a number of times to take advantage of the attenuation of developing that occurs during each rinsing step to achieve finer control over the developing process.

Once the conductive-resistive coating is finally developed and rinsed, it is dried and can either be coated with additional coatings or immediately used as a self-heating surface. To render the coating self-heating, electrodes may be installed in electrical connection with the coating, whereby attachment of the electrodes to a power supply transmits current through the coating and the coating yields thermal energy relative to its resistance value. Selection of a suitable power source will depend on the resistance value of the coating, on the desired thermal output, on the nature of the article coated by the self-heating coating, and on a variety of other variables and parameters that will be readily apparent to, and routinely selected by, those skilled in the art based on the present disclosure. Often, it will be preferable to power the coating using a low voltage source (e.g., a 6, 9, or 12 volt battery). For example, low voltage power supply enables the conductive-resistive coating to be safely used as a warming element for medical surfaces, survival blankets and other devices where wetting of the coated surface could cause shorting that would present unacceptable hazards if high voltage power sources were used. In other examples, the use of low voltage power sources in medical applications (e.g. to heat X-ray or examining tables, instruments, etc.) is particularly desired because the power supply does not present a large problem of magnetic interference with sensitive medical instruments.

Construction and design of electrodes, and their integration with coated surfaces of the invention, will also vary depending on the desired application, as will be apparent and readily embraced by persons of ordinary skill in the art. In this regard, it is worth noting that electrodes should employ like metals with the coating, for example bronze or copper, to minimize oxidation at the interface of the electrode or coating. It is of course contemplated that the electrical components powering the coatings of the invention may also be selected to be switchable to on and off selections and to provide a rheostatic function to adjust power output. Likewise, it will often be desirable to link the power source to a variable output power sources, such as may be provided by, for example, rheostats, time-controlled switches, thermal or optical sensor controlled switches (e.g., to sense internal or external heat or light to reflexively adjust thermal output of the coating to maintain thermal stasis of the coated article), and the like.

As with ordinary paint compositions, improvements in coating physical property reinforcement, ultraviolet ray transmission, coloring property, etc. can be made to the pre-conductive coating compositions by adding, as desired, pigments, fillers or other additives into the conductive-resistive coating compositions of the invention.

In addition, it may be desirable in certain applications to apply other coatings over the conductive-resistive coating layer, for example a heat resistant epoxy to protect the coated surface against moisture or wear, or to insulate the surface against undesired conductive contact that may cause shorting out or other damage. other such secondary coatings may include polyurethane, polyester resin, polyvinyl resin and like materials. With regard to adding secondary agents to the coating composition itself, careful account should be taken to ensure that the resultant admixture is stable and does not suffer corruption in terms of its handleabilty, behavior through spraying, drying and developing processes, and, most particularly, in terms of its final conductive-resistive properties and heat stability. Likewise, application of secondary coatings should also be undertaken with an eye toward preventing corrosion or other impacts that may be deleterious to the integrity or properties of the conductive-resistive coating. In particular, it is not desirable to apply a solvent based secondary coating, as the solvent may tend to attack and damage the primary, conductive-resistive coating.

The conductive-resistive coating compositions of the invention can be applied and maintained on a variety of desired surfaces, including in general most surfaces that will accept comparable paint coatings and which will safely withstand heat in accordance with the desired performance parameters and thermal properties of a particular coated article. Specifically, surfaces which work well with the conductive-resistive coating compositions of the invention include wood and other organic materials, glass, plastic, carbon and virtually any other non-conductive surfaces that meet the general requirements noted above.

A wide variety of applications of the compositions and methods for providing conductive-resistive surface coatings described herein are contemplated within the scope of the invention. These applications range across a diverse array of disciplines, including aerospace, aeronautics, electronics, military, and domestic or medical fields of application. Examples of aerospace applications in which the surface coating methods and compositions of the invention would prove useful include: heating of dark surfaces of geopositional satellites to maintain thermal uniformity of the satellite; heating of surfaces, such as control panels, inside space craft to prevent condensation; heating of sensitive components of space craft to minimize thermal shock upon entry to and return from space; preheating of heat shield nose cone tiles, to maintain flexibility of adhesives holding the tiles in place; and heating of space suits to minimize the need for bulky heating components. Examples of aeronautics applications for which the surface coating methods and compositions of the invention would prove useful include: heating of wing surfaces and helicopter rotors for deicing; heating of fuel tanks and batteries in cold climates; heating for condensation control in oil, lube, hydraulic and fuel tanks; and heating of sensitive surfaces, such as control panels, to prevent condensation. Examples of military applications for which the surface coating methods and compositions of the invention would prove useful include: providing a thermal surface identifier (e.g. a numbering system to avoid friendly fire or locate a signal) on troop clothing, equipment, aircraft, etc. to enable distant identification without reliance on radio signal integrity; and providing expendable thermal targets for training exercises or emit false signals for strategic deception. Examples of electronics applications for which the surface coating methods and compositions of the invention would prove useful include: providing thermoluminescent and electroluminescent displays, both of which may be designed for adjustable or fixed outputs; providing an adjustable radio frequency interference shielding having a selected resistivity.

EXAMPLE I

Production of a Conductive-Resistive, Self-Heating Surface Coating

To provide a pre-conductive coating composition according to the invention, a lacquer base was first provide which incorporates a butyl acetate solvent and nitrocellulose as a base solid. For this purpose, a commercially available lacquer base, "Sher-wood" gloss T75 C 42 (Rudd Paint Company, Seattle, Wash.) was obtained, which contains about 24% solids as a percentage of total volume, of which solids about 30–45% is nitrocellulose, 10–20% is a plasticizer (diethylexalatetarphthalate) and 40–50% is a short oil alkyd (drying agent). The evaporative portion of this lacquer base comprises about 60–85% butyl acetate, 5–15% toluene and 0–10% isopropyl alcohol by volume.

195 ml of the lacquer base was mixed with approximately 0.45 kg of bronze powder and further thinned by addition of about 565 ml of butyl acetate (in addition to the solvent already present in the lacquer base). The lacquer base contained a conventional amount of a plasticizing additive, di-ethyl terpthalate. Shelf life of this pre-conductive coating composition was found to be indefinite. Gelling that occurs following mixing of conventional conductive paints did not occur, nor did concomitant clogging of spray nozzles, when spray-tested after ten days, one month, six months and up to a year after mixing.

The pre-conductive coating composition formulated in this example had excellent surfacing properties, and a short drying time. The composition was suitable for application by dipping of articles into the pre-conductive coating composition, or, alternatively, brushing or spraying the composition over the article to form a pre-conductive coating on the surface of the article. For spray coating, a 4×6 inch lexan sheet, about ⅛ inch thick was sprayed using a high quality air brush equipped with an oil and moisture filter. The air pressure was set at about 20 p.s.i., and the brush was preferably held at a spray distance of approximately 6–9 inches from the surface of the lexan sheet. Coating was even, and excess coating composition was wiped of with a soft cotton cloth. To achieve a preferred thickness of the pre-conductive coating, approximately ½ ounce of the pre-conductive coating composition was used per square foot of surface that was coated.

After the surface was sprayed with the pre-conductive coating in the manner described above, the coating was allowed to dry for approximately 5 minutes at 200° F.

After drying, the pre-conductive coating was exposed to a developer solution by dipping the panel in a quart size container of developer. The selected developer comprised an aqueous solution of a commercial activator UDYPREP®350 containing salts of sodium fluoride/hydrogen sulfate (about 85–95% by weight sodium hydrogen sulfate and 2.5–5% fluorides as F). Approximately 1.6 ounces of activator was mixed with one quart of distilled water, with the pH adjusted to pH 2.3. The temperature of the developer was selected at 68° F., and the coated article was immersed in the developer for a period of 60 seconds.

After immersion in the developer, the coating was rinsed by immersion with gentle agitation in a pH adjusted, distilled water bath to stop the developing process. The pH of the rinse bath was selected at pH 5.8, and the time period of rinsing was selected at 30 seconds.

Once the conductive-resistive coating was finally developed and rinsed, it was dried for 5 minutes in an oven at 200° F.

Resistance of the dried coating was determined by diagonal measurement across the panel, whereby a total resistance value for the 24 square inch area of the coating was found to be approximately 18.1 ohms.

Electrodes were installed in electrical connection between the coating and a power source to transmit current through the coating, whereby the self-heating capacity of the conductive-resistive coating under varying voltage and amperage of the power source was determined. Specifically, the selected power source was a D.C. 100% filtered power source having a 60 volt, 50 amp. capacity. Amperage and voltage to the conductive-resistive coating was set as shown in Table 1, below, and the surface temperature increase capacity of the coating under these different power regimes was determined. More specifically, surface temperature of the coating was tested after 5 minutes and again after 30 minutes at each of the voltage/amperage settings indicated, and the temperatures remained stable at the values specified in Table 1 throughout this testing period. This stability was maintained by exposing the self-heating surface to forced air circulation from a standard table fan at 2,000 cfm, at an ambient temperature of 62° F.

TABLE 1

Self-Heating Capacity of Conductive-Resistive Coating Under Different Power Regimes

| VOLTS | AMPS | SURFACE TEMPERATURE OF COATING |
|---|---|---|
| 23.4 | 4.00 | 150° F. |
| 29.1 | 4.00 | 158° F. |
| 30.0 | 4.75 | 160° F. |
| 32.1 | 5.00 | 180° F. |
| 44.3 | 5.00 | 185° F. |

EXAMPLE II

Selection of Resistance by Adjusting Pre-Conductive Coating Composition, Developer Composition, and Rinse pH As noted above, adjustments in the amount of lacquer base is one of several means for determining a final, selected resistance value for the conductive-resistive coatings of the invention. Selectability of resistance for the conductive-resistive coatings can also be determined by adjustments of the strength, pH and duration of development, and further by adjusting the pH and other parameters of the rinse (which in turn affects the overall kinetics of development).

The amount of lacquer base included in the pre-conductive coating composition is a particularly important factor in determining the ability to develop the pre-conductive coating to achieve a desired, selectable conductive-resistive capacity of the final conductive-resistive coating. If the relative amount of lacquer is too low, developing proceeds too rapidly and the pre-conductive coating develops conductivity too fast. Consequently, the resistance drops precipitously during development to a level that is too low for most selected applications. Under such circumstances, the conductive-resistive capacity of the final conductive-resistive coating composition is not "selectable" using reasonably controlled and repeatable methods.

Referring, for example, to FIGS. 1 and 2 below, FIG. 1 depicts developing results for a pre-conductive coating composition having only 120 ml of lacquer mixed with 0.45 kg of metallic powder and further thinned by addition of approximately 640 ml of butyl acetate. In contrast, FIG. 2 depicts developing results for a pre-conductive coating composition of the invention having about 195 ml of lacquer base mixed with 0.45 kg of metallic powder and further thinned by addition of approximately 565 ml of butyl acetate (both examples of FIGS. 1 and 2 featured development in a solution of 1.6 ounces of UDYPREP®350 in one quart distilled water, adjusted to pH 2.3, followed by a rinse for 30 seconds in distilled water adjusted to pH 5.7).

As depicted in FIG. 1, the pre-conductive paint composition having the lower lacquer base/butyl acetate ratio yields a precipitous increase in conductivity of the resultant coating, lowering the resistance to approximately 20.7 ohms measured across a 4 inch by 6 inch coated panel under the conditions specified after just 15 seconds, and to approximately 7.2 ohms across the same surface area after only 30 seconds. In contrast, FIG. 2 shows that a pre-conductive coating composition having a preferred minimum amount of lacquer base (e.g., approximately 195 ml lacquer base, approximately 0.45 kg metal powder and about 565 ml butyl acetate in addition to a pre-mixed amount of butyl acetate (approximately 60–85% and preferably about 75% of the evaporative portion of the lacquer base) already formulated in the lacquer base), yields a much more controlled development process, producing a resistance of the final conductive-resistive coating of about 58.7 ohms across a 4×6 inch plate after 15 seconds of developing time, and 25.7 ohms after 30 seconds of developing time.

In addition to adjusting the pre-conductive coating ingredients, selectability of resistive and self-heating capacities of the conductive-resistive coating can also be determined by adjusting the composition and/or pH of the developer, the duration of development, and/or the pH of the rinse, among other variables. By selecting one or more adjustments of these variables, a final resistance of the conductive-resistive coating can be selected within a preferred range of desired values, e.g., within a preferred range of approximately 5–1,000 ohms, preferably between about 10–300 ohms, more preferably between about 15–60 ohms, or between about 20–35 ohms (all values being measured across a flat, 4×6 coated panel), depending on the intended application of the coating.

To illustrate the effects of developer strength and of duration of development on resistivity of the final conductive-resistive coating, FIGS. 1 and 2 depict examples where approximately 1.6 ounces of activator was mixed with one quart of distilled water, with the pH adjusted to pH 2.3. In contrast, in the examples of FIGS. 3 and 4, approximately 4.0 ounces of activator was used per quart of distilled water, with the pH adjusted to pH 2.3. and the temperature of the developer is about 68° F. As FIG. 2 shows, at the lower concentration of activator, the developer yielded a highly controllable reaction whereby the pre-conductive coating increased its conductivity and decreased its resistivity as a function of time in the developer at a rate that allowed selection of pre-determined resistance values for the final conductive-resistive coating within a wide range of desired resistance values. For example, if a desired resistance of the coating is between about 25 and 60 ohms, a selected time of developing could be chosen between about 15 and 30 seconds. Based on the gradual kinetics of development shown in FIG. 2, resistance values can be routinely selected within this range of 25–60 ohms by stopping the developing process at a selected time point intermediate the time points shown of 15–30 seconds (provided the same selected pre-conductive composition formula is used, and the same developer concentration, pH and temperature is selected). Naturally, other resistance values can be selected by using longer or shorter developing times, e.g., as shown in FIG. 2, a resistance between about 15 ohms and 25 ohms across a 4×6 inch panel can be selected by developing between about 30–60 seconds at the conditions shown.

In contrast, these selected ranges of resistance values cannot be achieved at comparable development times and temperatures if the developer is adjusted in strength (e.g. by increasing the concentration of activator or other developing agent) to yield accelerated kinetics of development. As depicted, for example, in FIG. 3, increasing the strength of developer approximately 4 ounces of activator (UDYPREP®350) per quart of distilled water accelerated the developing time at 68° F. so that a range of resistance between 25 ohms and 60 ohms became non-selectable. The kinetics of the developing reaction were simply too fast to allow selection of certain desired resistance values for the final conductive-resistive coating within a selected time period of development, for example within a narrow time window of between 15–30 seconds.

Figure 4:
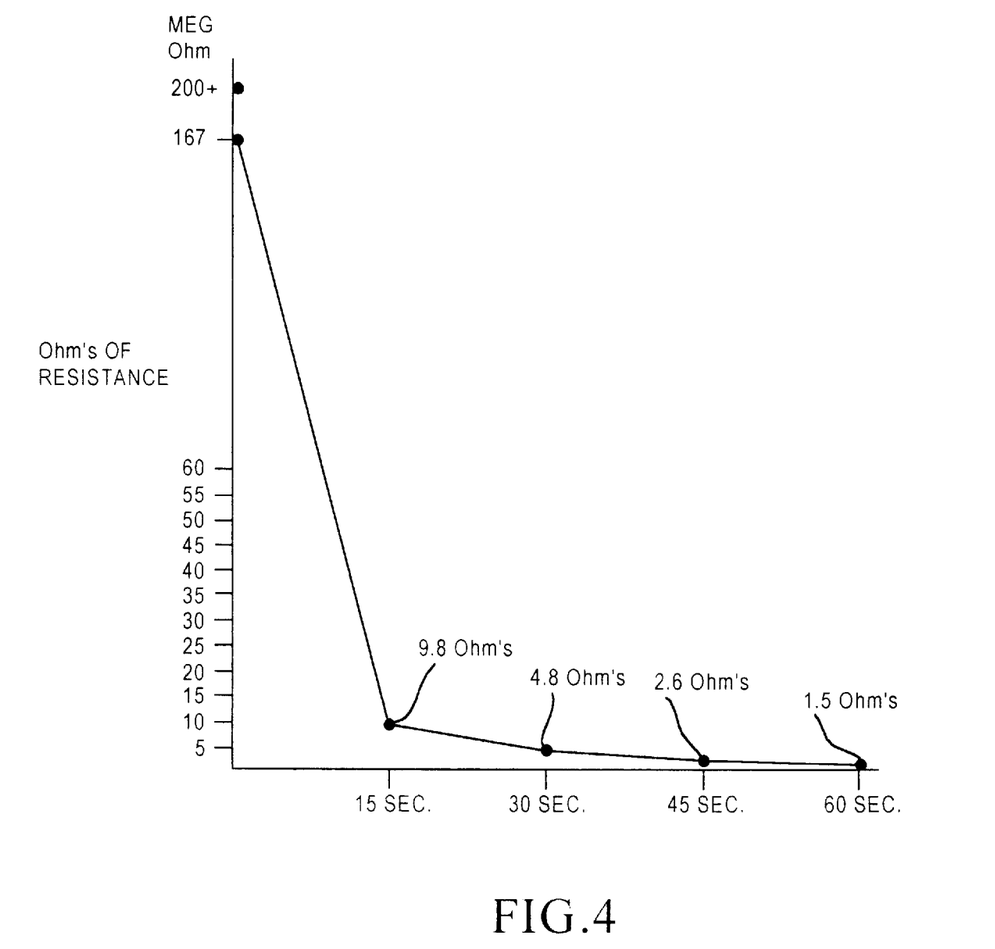
FIG. 4 depicts developing results for a pre-conductive coating composition having 120 ml of lacquer mixed with 0.45 kg of metallic powder and further thinned by addition of approximately 640 ml of butyl acetate. The pre-conductive coating was developed at 68° F. in a solution of 1.6 ounces of UDYPREP®350 in one quart distilled water, adjusted to pH 2.3, followed by a rinse at 68° F. for 30 seconds in distilled water adjusted to pH 5.7.

Comparing FIGS. 1–4, it can be seen that selectability of resistivity of the conductive-resistive coating can be determined to a finer or less controlled extent by adjusting more than one of the variables that affect resistance of the coating simultaneously. For example, FIGS. 1 and 4 depict resistivity results at various times for a pre-conductive coating composition having only 120 ml of lacquer mixed with 0.45 kg of metallic powder and further thinned by addition of approximately 640 ml of butyl acetate. FIGS. 2 and 3 depict developing results for a pre-conductive coating composition of the invention having a preferred lacquer content of about 195 ml of lacquer base mixed with 0.45 kg of metallic powder and further thinned by addition of approximately 565 ml of butyl acetate. In addition to these selected variables, the selectable resistance values reflected in FIGS. 1 and 2 differ from those of FIGS. 3 and 4 in part because the developer solutions of FIGS. 1 and 2 were comprised of 1.6 ounces of UDYPREP®350 in one quart distilled water, while those of FIGS. 3 and 4 were comprised of 4.0 ounces of UDYPREP®350 in one quart distilled water (all trials being run at 68° F. for both developer and rinse, and all rinses being at pH 5.7 for 30 seconds with mild agitation). As can be seen by comparing the figures, the finest selectability of resistance values was achieved in the trial of FIG. 2, with the combination of conditions used in FIGS. 1, 3 and 4 resulting in progressively less and less controlled results. The poorest selectability, reflected in the trial of FIG. 4, illustrates that the combination of a strong developer solution and undesirably low lacquer base content in the pre-conductive coating composition precluded selectability of resistance values over 9.3 ohms after 15 seconds of development, and the precipitous slope of the developing curve prior to 15 seconds also limits fine selectability of lesser resistance values during this period.

Although the foregoing invention has been described in detail for the purposes of clarity of understanding, it will be obvious to those of ordinary skill in the art that other embodiments and variations of the invention are possible which employ the basic inventive concepts described above. Therefore, the invention is not to be limited by the above disclosure, but is to be determined in scope by the claims which follow.

What is claimed is:

1. A method for forming a conductive-resistive coating on a non-conductive surface comprising the steps of:
   applying a pre-conductive coating composition comprising a lacquer base containing butyl acetate as a solvent and a conductive agent onto said non-conductive surface to form a pre-conductive coating;
   exposing said pre-conductive coating to a developer to confer a conductive-resistive capacity to said pre-conductive coating to yield a conductive-resistive coating; and
   exposing the conductive-resistive coating to an aqueous rinse having a pH between about pH 5.0 and pH 6.8 after said step of exposing the pre-conductive coating to the developer.

2. A method according to claim 1, wherein the lacquer base contains between 60% and 85% butyl acetate by volume as a fraction of total volatile content of the lacquer base and nitrocellulose as a base solid, and a bronze metallic powder.

3. A method according to claim 1, wherein the pre-conductive coating composition contains a ratio of at least one part of the lacquer base to five parts butyl acetate by volume.

4. A method according to claim 1, wherein the pre-conductive coating composition contains a ratio of the lacquer base to butyl acetate of between about 1:4 and 1:3 by volume.

5. A method according to claim 1, wherein the pre-conductive coating composition is applied to said non-conductive surface by spraying.

6. A method according to claim 1, wherein the aqueous rinse has a pH between about pH 5.5 and pH 6.5.

7. A method according to claim 1, further comprising the step of drying said conductive-resistive coating at an ambient temperature of between about 100° F. and 250° F.

8. A method according to claim 1, wherein the developer is an acidic solution having a pH of less than about pH 3.0.

9. A method according to claim 1, wherein the developer is a solution of hydrogen sulfate and sodium fluoride.

10. A method for forming a self-heating, conductive-resistive coating on a non-conductive surface comprising the steps of:
    applying a pre-conductive coating composition comprising a lacquer base containing butyl acetate as a solvent and a conductive agent onto said non-conductive surface to form a pre-conductive coating;
    exposing said pre-conductive coating to a developer to confer a conductive-resistive capacity to said pre-conductive coating to yield a conductive-resistive coating; and
    exposing the conductive-resistive coating to an aqueous rinse having a pH between about pH 5.0 and pH 6.8 after said step of exposing the pre-conductive coating to the developer.

11. A method according to claim 10, including the steps of drying said conductive-resistive coating and connecting said conductive resistive coating to a power source, whereby said conductive-resistive coating generates heat.

12. A method according to claim 10, wherein the pre-conductive coating composition contains a ratio of the lacquer base to butyl acetate of between about 1:4 and 1:3 by volume.

13. A method according to claim 10, wherein the lacquer base contains between 60% and 85% butyl acetate by volume as a fraction of total volatile content of the lacquer base and nitrocellulose as a base solid, and a bronze metallic powder.

14. A method according to claim 10, wherein the pre-conductive coating composition is applied to said non-conductive surface by spraying.

15. A method according to claim 10, wherein the aqueous rinse has a pH between about pH 5.5 and pH 6.5.

16. A method according to claim 10, wherein the developer is an acidic solution having a pH of less than about pH 3.0.

17. A method according to claim 10, wherein the developer is a solution of hydrogen sulfate and sodium fluoride.

18. A method for forming a conductive-resistive coating on a non-conductive surface comprising the steps of:
    applying a pre-conductive coating composition comprising a lacquer base containing butyl acetate as a solvent and a conductive agent onto said non-conductive surface to form a Pre-conductive coating;
    exposing said pre-conductive coating to a developer to confer a conductive-resistive capacity to said pre-conductive coating to yield a conductive-resistive coating; and
    exposing the conductive-resistive coating to an aqueous rinse having a pH between about pH 5.0 and pH 6.8 after said step of exposing the pre-conductive coating to the developer, wherein a final resistance of the conductive-resistive coating is achieved within a range of between about 0.2 and 42.0 ohms/inch$^2$.

19. A method for forming a conductive-resistive coating according to claim 18, wherein the final resistance of the conductive-resistive coating is achieved within a range of between about 0.6 and 2.5 ohms/inch$^2$.

20. A method for forming a conductive-resistive coating according to claim 18, wherein the final resistance of the conductive-resistive coating is achieved within a range of between about 0.8 and 1.5 ohms/inch$^2$.

21. A method for forming a conductive-resistive coating according to claim 18, further including the step of re-exposing the conductive-resistive coating to developer after rinsing to provide a repeated cycle of developing and attenuated stoppage of development.

22. A method for forming a conductive-resistive coating according to claim 18, wherein resistance values of the conductive-resistive coating are achieved by selecting development times between about 5 seconds and 10 minutes.

23. A method for forming a conductive-resistive coating according to claim 18, wherein incremental resistance values of the conductive-resistive coating are achieved based on corresponding, incremental adjustments of development period.

24. A method for forming a conductive-resistive coating according to claim 23, wherein an incremental range of development periods is defined by increments selected from 10 second, 15 second, 30 second, one minute, three minute and five minute time increments.

25. A method for forming a conductive-resistive coating according to claim 18, wherein conductivity of the conductive-resistive coating can be increased during the developing process at a rate of between about 0.5–300 ohms of increased conductivity (as measured for a 24 inch$^2$ surface area) per 15 seconds of development time.

26. A method for forming a self-heating, conductive-resistive coating on a non-conductive surface comprising the steps of:

applying a pre-conductive coating composition comprising a lacquer base containing butyl acetate as a solvent and a conductive agent onto said non-conductive surface to form a pre-conductive coating;

exposing said pre-conductive coating to a developer to confer a conductive-resistive capacity to said pre-conductive coating to yield a conductive-resistive coating; and exposing the conductive-resistive coating to an aqueous rinse having a pH between about pH 5.0 and pH 6.8 after said step of exposing the pre-conductive coating to the developer, wherein the conductive resistive coating has a thermal increase capacity of between 3° F. and 275° F.

27. A method for forming a self-heating, conductive-resistive coating according to claim 26, wherein the conductive resistive coating has a thermal increase capacity of between about 25° F. and 100° F.

28. A method for forming a self-heating, conductive-resistive coating according to claim 26, wherein a thermal increase capacity of the conductive resistive coating is achieved incrementally based on corresponding, incremental adjustments of conditions selected from the group consisting of (1) lacquer content of the pre-conductive coating composition; (2) development period; (3) strength of developer; (4) pH of developer and/or rinse; and (5) attenuation of development by repeated exposure to developer interposed with rinsing.

* * * * *